United States Patent [19]
Goring

[11] Patent Number: 5,338,049
[45] Date of Patent: Aug. 16, 1994

[54] SADDLE AND EQUIPMENT CART

[76] Inventor: Christine B. Goring, 74 Manor Rd., Huntington, N.Y. 11743

[21] Appl. No.: 144,405

[22] Filed: Nov. 2, 1993

[51] Int. Cl.$^5$ .............................................. B62B 1/16
[52] U.S. Cl. ............................ 280/47.19; 280/47.26; 280/47.315; 280/659
[58] Field of Search ............... 280/47.18, 47.19, 47.26, 280/47.33, 47.35, 47.315, 63, 79.2, 79.3, 652, 659; 211/34, 36, 37; D34/24, 26

[56] References Cited

U.S. PATENT DOCUMENTS

| D. 177,179 | 3/1956 | Hodgman | 280/47.26 X |
| D. 243,752 | 3/1977 | Kardas | D12/32 |
| D. 252,197 | 6/1979 | Gale | D12/29 |
| D. 338,306 | 8/1993 | White et al. | 280/47.18 X |
| 3,010,775 | 11/1961 | Giovannelli | 280/47.19 |
| 3,889,967 | 6/1975 | Sauer | 280/47.35 |
| 3,930,663 | 1/1976 | Scripter | |
| 4,049,284 | 9/1977 | Capper | 280/47.18 |
| 4,253,677 | 3/1981 | Wissler | 280/47.18 |
| 4,412,689 | 11/1983 | Lee | 280/47.18 X |
| 4,842,289 | 6/1989 | Samuels | 280/47.19 X |
| 4,880,248 | 11/1989 | Elmer | 280/47.35 |

FOREIGN PATENT DOCUMENTS 2053812 2/1981 United Kingdom ............. 280/47.35

OTHER PUBLICATIONS

Schneider's Saddlery Co., Inc. 1993 Catalog "Saddle, Grooming & Tack Storage", Oct. 1992.

Primary Examiner—Brian L. Johnson
Attorney, Agent, or Firm—Richard L. Miller

[57] ABSTRACT

A saddle and equipment cart is provided which consists of a main cabinet body having an open top with a storage compartment for storing various equestrian articles therein. A pair of spaced apart ground wheels are pivotally attached to a lower back end of the main cabinet body, for supporting the cart above the ground. A handle is attached to an upper front end of the main cabinet body for manual operation of the cart. A pair of spaced apart support legs are attached to a lower front end of the main cabinet body in a downward position, to cooperate with the ground wheels in supporting the cart on the ground. A lid is hinged to one side at the open top of the main cabinet body. A saddle bearer on the lid has a dorsal fin to receive and hold an equestrian saddle thereon. A boot valet being a pair of L-shaped rods are mounted to the back end of the main cabinet body, with each rod having a knob to retain each of a pair of riding boots in an inverted position thereon.

4 Claims, 1 Drawing Sheet

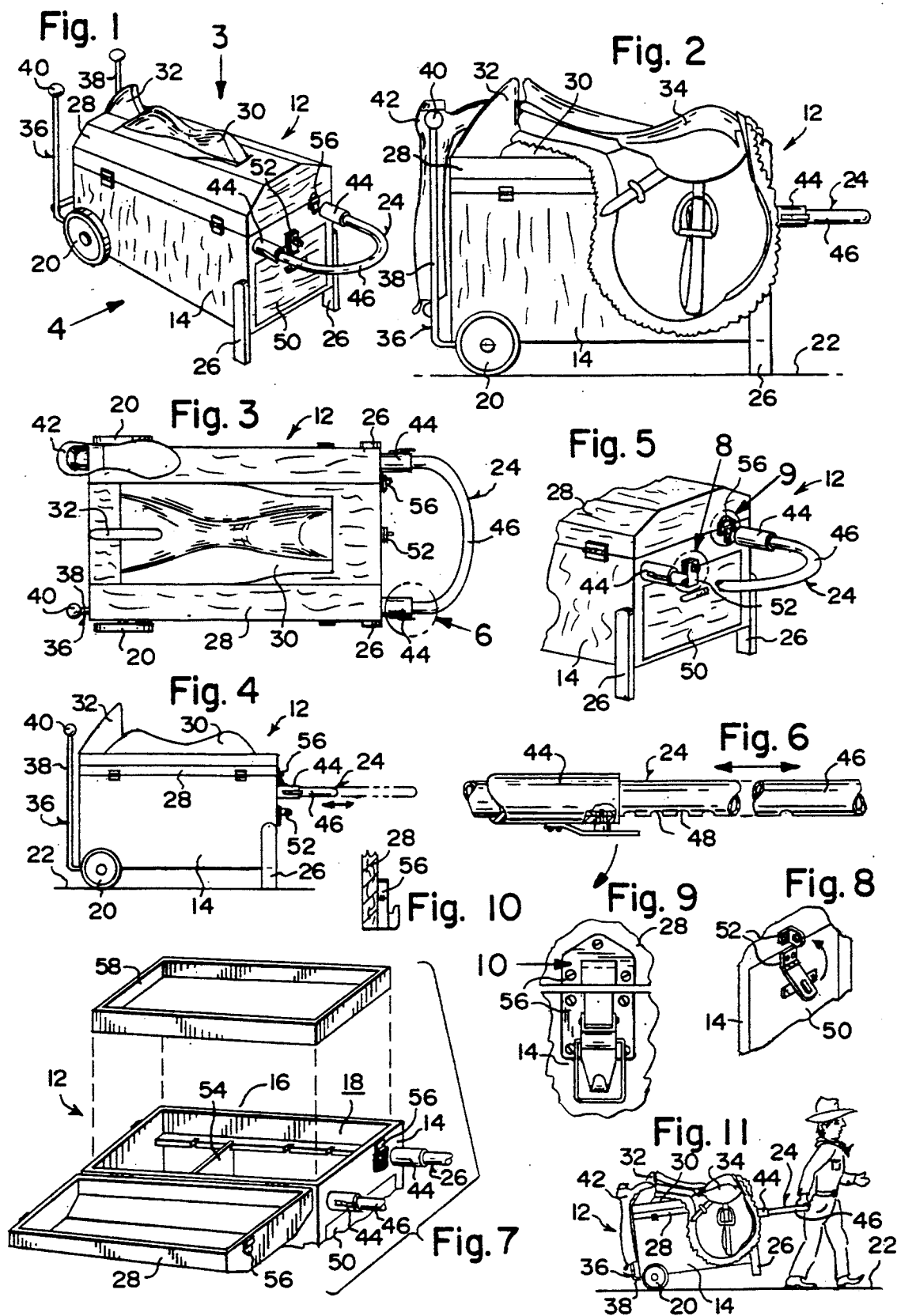

SADDLE AND EQUIPMENT CART

BACKGROUND OF THE INVENTION

The instant invention is the subject matter of Disclosure Document No.: 327,295 filed in the PTO on Mar. 4, 1993, and it is respectfully requested that this document be retained beyond the two-year period so that it may be relied upon as evidence of conception of the invention during the prosecution phase of this application, should the need arise.

The instant invention relates generally to wheeled carriers and more specifically it relates to a saddle and equipment cart.

Numerous wheeled carriers have been provided in prior art that are adapted to haul, store and organize various types of articles. For example, U.S. Pat. Nos. 3,930,663 to Scripter; 4,880,248 to Elmer; Des. 243,752 to Kardas and Des. 252,197 to Gale all are illustrative of such prior art. While these units may be suitable for the particular purpose to which they address, they would not be as suitable for the purposes of the present invention as heretofore described.

SUMMARY OF THE INVENTION

A primary object of the present invention is to provide a saddle and equipment cart that will overcome the shortcomings of the prior art devices.

Another object is to provide a saddle and equipment cart that is designed to help an equestrian sports person transport their equipment around easily.

An additional object is to provide a saddle and equipment cart that would eliminate the need for an extra hand, such as a hired groom, on show or event days to carry additional tack articles for the equestrian sports person.

A further object is to provide a saddle and equipment cart that is simple and easy to use.

A still further object is to provide a saddle and equipment cart that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures on the drawings are briefly described as follows:

FIG. 1 is a diagrammatic perspective view of the instant invention;

FIG. 2 is an enlarged side elevational view thereof with a saddle and one riding boot illustrated installed thereon;

FIG. 3 is an enlarged top plan view taken in the direction of arrow 3 in FIG. 1, with one riding boot installed thereon;

FIG. 4 is a side elevational view taken in the direction of arrow 4 in FIG. 1;

FIG. 5 is an enlarged partial front perspective view illustrating various latches in greater detail;

FIG. 6 is an enlarged top view of the area indicated by arrow 6 in FIG. 3 illustrating the pull handle in greater detail;

FIG. 7 is an enlarged diagrammatic perspective view with parts broken away illustrating the lid open and the tray exploded from the storage compartment;

FIG. 8 is an enlarged diagrammatic perspective view of the drawer latch in greater detail, indicated by arrow 8 in FIG. 5;

FIG. 9 is an enlarged diagrammatic front view of the lid latch in greater detail, indicated by arrow 9 in FIG. 5;

FIG. 10 is an enlarged side elevational view with parts in section and broken away taken in the direction of arrow 10 in figure 9; and FIG. 11 is a diagrammatic side elevational view illustrating the instant invention in use.

DETAILED DESCRIPTION OF THE PREFERRED EMBODIMENT

Turning now descriptively to the drawings, in which similar reference characters denote similar elements throughout the several views, FIGS. 1 through 11 illustrate a saddle and equipment cart 12, which consists of a main cabinet body 14 having an open top 16 with a storage compartment 18, for storing various equestrian articles therein. A pair of spaced apart ground wheels 20 are pivotally attached to a lower back end of the main cabinet body 14, for supporting the cart 12 above the ground 22. A handle 24 is attached to an upper front end of the main cabinet body 14, for manual operation of the cart 12. A pair of spaced apart support legs 26 are attached to a lower front end of the main cabinet body 14 in a downward position, to cooperate with the ground wheels 20 in supporting the cart 12 on the ground 22. A lid 28 is hinged to one side at the open top 16 of the main cabinet body 14. A saddle bearer 30 on the lid 28 has a dorsal fin 32 to receive and hold an equestrian saddle 34 thereon. A boot valet 36, being a pair of L-shaped rods 38, are mounted to the back end of the main cabinet body 14. Each rod 38 has a knob 40 typically ball shaped to retain each of a pair of riding boots 42 in an inverted position thereon.

The handle 24 includes a pair of spaced apart spring release mechanisms 44 mounted to the upper front end of the main cabinet body 14. A generally U-shaped tubular member 46 is provided, with each end having a plurality of apertures 48. Each end can be inserted into one spring release mechanism 44, making the handle 24 adjustable and retractable.

The main cabinet body 14 further contains a drawer 50 in the front end. A drawer latch 52 is for retaining the drawer 50 in a closed position in the front end. At least one adjustable divider 54 is in the drawer 50, to meet changing storage needs therein.

A lid latch 56 is for retaining the lid 28 in a closed position over the open top 16 of the main cabinet body 14. A removable tray 58 is also provided, which fits into the open top 16 of the main cabinet body 14.

OPERATION OF THE INVENTION

To use the saddle and equipment cart 12 to transport various equestrian paraphernalia, a person can place equestrian articles within the tray 58, close the lid 28 and lid latch 56. The drawer 50 can also contain equestrian articles with the drawer latch 52 closed. The handle 24 is then adjusted to a comfortable position for maneuvering the cart. The riding boots 42 are placed onto the boot valet 36 and the equestrian saddle 34 onto the saddle bearer 30. The person can now pull or push the cart 12 by the handle 24, so that the wheels 20 will ride upon the ground 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A saddle and equipment cart which comprises:
   a) a main cabinet body having an open top with a storage compartment for storing various equestrian articles therein;
   b) a pair of spaced apart ground wheels pivotally attached to a lower back end of said main cabinet body for supporting said cart above the ground;
   c) a handle attached to an upper front end of said main cabinet body for manual operation of said cart;
   d) a pair of spaced apart support legs attached to a lower front end of said main cabinet body in a downward position, to cooperate with said ground wheels in supporting said cart on the ground;
   e) a lid hinged to one side at the open top of said main cabinet body;
   f) a saddle bearer on said lid, having a dorsal fin to receive and hold an equestrian saddle thereon; and
   g) a boot valet being a pair of L-shaped rods mounted to the back end of said main cabinet body, with each said rod having a knob to retain each of a pair of riding boots in an inverted position thereon.

2. A saddle and equipment cart as recited in claim 1, wherein said handle includes:
   a) a pair of spaced apart spring release mechanism mounted to the upper front end of said main cabinet body; and
   b) a generally U-shaped tubular member with each end having a plurality of apertures, so that each end can be inserted into one said spring release mechanism, making said handle adjustable and retractable.

3. A saddle and equipment cart as recited in claim 2, wherein said main cabinet body further includes:
   a) a drawer in the front end;
   b) a drawer latch for retaining said drawer in a closed position in the front end; and
   c) at least one adjustable divider in said drawer, to meet changing storage needs therein.

4. A saddle and equipment cart as recited in claim 3, further including:
   a) a lid latch for retaining said lid in a closed position over the open top of said main cabinet body; and
   b) a removable tray which fits into the open top of said main cabinet body.

* * * * *